United States Patent [19]

Sasaki et al.

[11] Patent Number: 4,701,871
[45] Date of Patent: Oct. 20, 1987

[54] SIGNAL GENERATOR USING DIGITAL MEMORY

[75] Inventors: Takayuki Sasaki, Kanagawa; Masaaki Arai, Tokyo, both of Japan

[73] Assignee: Sony Corporation, Tokyo, Japan

[21] Appl. No.: 656,226

[22] Filed: Oct. 1, 1984

[30] Foreign Application Priority Data

Oct. 7, 1983 [JP] Japan ................................ 58-187973

[51] Int. Cl.$^4$ .............................................. G06F 1/02
[52] U.S. Cl. ...................................... 364/718; 364/721
[58] Field of Search .............. 364/718, 719, 720, 721, 364/722, 852; 328/14; 375/62, 65; 360/30

[56] References Cited

U.S. PATENT DOCUMENTS 3,727,037 4/1973 Zorn ..................................... 364/719
4,159,526 6/1979 Mosley, Jr. et al. ................ 364/721

FOREIGN PATENT DOCUMENTS 1358236 7/1974 United Kingdom .
1404559 9/1975 United Kingdom .
1510646 5/1978 United Kingdom .
2047999 12/1980 United Kingdom .
2059711 4/1981 United Kingdom .
2061053 5/1981 United Kingdom .

Primary Examiner—Archie E. Williams, Jr.
Assistant Examiner—Tan V. Mai

[57] ABSTRACT

The present invention comprises a signal generator which uses digital memory for generating a digital signal which has a value which periodically varies with a memory having $2^n$ addresses in each of which data for one period of the digital signal is stored and includes a circuit for multiplying a digital control input having a variable value by a predetermined coefficient and includes an integrator for integrating the control input multiplied by said coefficient at every predetermined clock signal so as to produce an address signal for said memory and said address signal varying step by step at a predetermined number of intervals corresponding to said digital control input.

7 Claims, 15 Drawing Figures

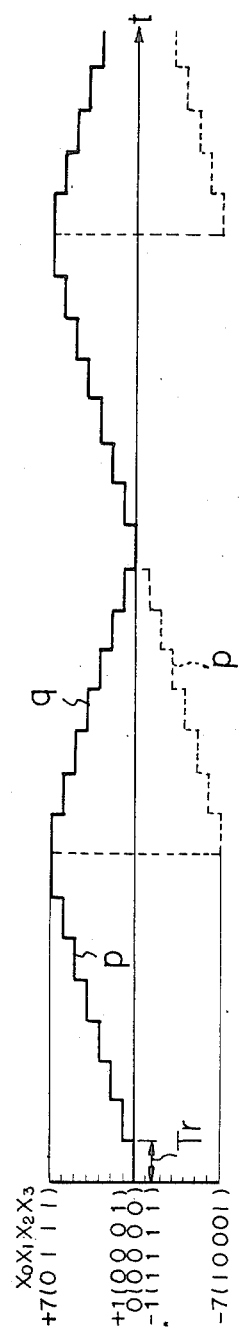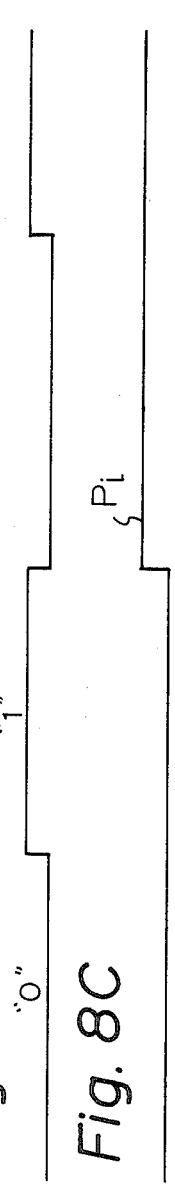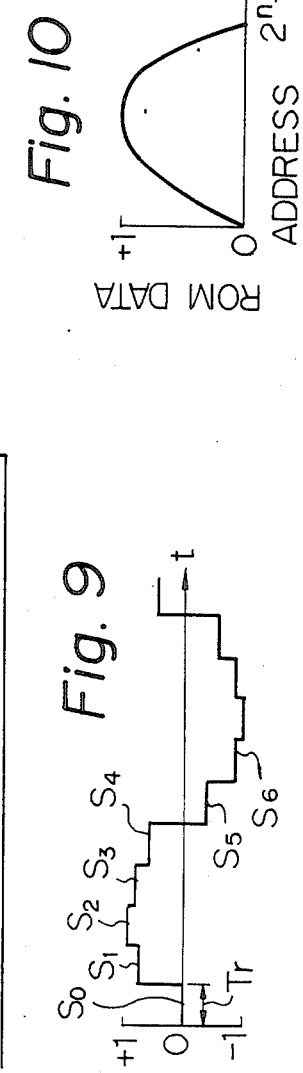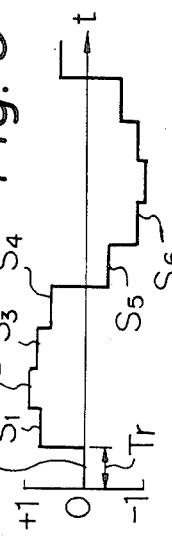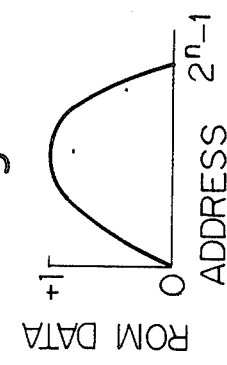

SIGNAL GENERATOR USING DIGITAL MEMORY

BACKGROUND OF THE INVENTION

1. Field of the Invention

This invention relates in general to a signal generator which has a digital memory that can digitally generate a signal such as a sine wave which has periodicity.

2. Description of the Prior Art

If a number of sample data during one period of a sine wave are stored in a memory such as a ROM and if the address of the ROM is changed step by step at predetermined intervals, a digital sine wave can be generated. The maximum value of the addresses of the ROM in this kind of digital signal generator is determined by the number of bits of the address input and the frequency of the output signal and the clock frequency, and generally this will not be ($2^n-1$). For this reason, the address generator becomes complicated which presents a problem.

Also, another arrangement wherein a part of the data of one period of a sine wave is stored in the ROM and the data having the negative polarity is formed by inverting the polarity of the readout data from the ROM and wherein changes of the ascending and descending portion are performed by inverting the address signal. With such a construction, the capacity of the ROM can be small. For this construction, unless the number of addresses of the ROM is $2^n$, a complicated circuit must be used to form from the values of the address control signals for controlling the inversion of the polarity of the data read out and for controlling the ascending and descending portion of the address signal which results in the operating speed being slow.

OBJECTS AND SUMMARY OF THE INVENTION

It is an object of the present invention to provide a signal generator which has a digital memory in which the number of addresses of the memory for storing data of a digital signal such as a sine wave which has periodicity or a cosine wave or other repetitive wave is $2^n$ which simplifies the construction of an address producing circuit.

Another object of the invention is to provide a signal generator which uses a digital memory in which a part of the data for one period of the digital signal having periodicity may be stored thereby allowing the capacity necessary for the memory to be small.

Yet another object of the invention is to provide a signal generator using a digital memory in which the signals for controlling the readout data from the memory or the inversion of the polarity of the address can be formed by a circuit which has a simple construction and where a part of the data for one period is stored and where high speed operation can be accomplished.

The present invention relates to a signal generator which has a digital memory which generates a digital signal that has values which periodically change.

The invention comprises a memory having $2^n$ addresses in which the data for one period of a digital signal is stored and also includes a circuit for multiplying a digital control input signal having a variable value by a predetermined coefficient and a circuit for integrating the control input multiplied by a coefficient at every predetermined clock pulse so as to generate an address signal for the memory. The address signal varies step by step in a predetermined number of intervals corresponding to the digital control input.

The invention comprises a memory having $2^n$ addresses in each of which a part of the data for one period of a digital signal is stored and an address producing circuit to which digital control input having a variable value is supplied and which produces an address signal for the memory with the address signal varying step by step at a predetermined number of intervals corresponding to the digital control input. Also, a detecting circuit for generating a detection signal when the number of addresses produced by the address producing circuit is $2^n$ or more and an inversion control circuit for inverting the polarity of at least one of the address signals to the memory and the readout output from the memory in response to the detection signal are provided.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a map illustrating how FIGS. 1A and 1B connect together,

FIGS. 8A, 8B and 8C are graphs for explaining the operation of the embodiments of the invention, FIG. 9 is a graph for explaining the operation of the invention, and FIG. 10 is a graph for explaining an embodiment of the invention.

DESCRIPTION OF THE PREFERRED EMBODIMENTS

FIG. 1 illustrates a complete arrangement of a recording and reproducing apparatus for a color signal to which the present invention can be applied. The color video signal recording and reproducing apparatus records a color still picture signal of one frame (or one field) as one or two circular tracks T on a magnetic disc or sheet S with a fixed magnetic head 1. One magnetic sheet is enclosed in a hard shell (not shown) and is rotated by a motor M. Up to one hundred circular tracks can be formed on one magnetic sheet. The magnetic sheet cassette is small and can be used as a recording medium for a still picture video camera.

FIG. 1 shows a signal processing arrangement wherein a color video signal can be recorded and reproduced. The embodiment can record any of a composite color video signal of a NTSC system and component color video signals consisting of three primary color signals. The composite color video signal is generally the reproduced output while the component color video signals are produced for monitoring. A signal which is recorded on a magnetic sheet S consists of a frequency modulated luminance signal $Y_{FM}$ and a frequency modulated line sequential chrominance signal. For instance a center frequency $f_Y$ of the signal $Y_{FM}$ is set to a predetermined frequency within the frequency range of 6 to 7.5 MHz and a frequency modulated center frequency $f_R$ of the red color difference signal $R-Y$ is set to for example 1.2 MHz and an FM modulated center frequency $f_B$ of the blue color difference signal $B-Y$ is set to, for example, 1.3 MHz. These two color difference signals are line-sequenced such that they alternately appear at every 1 H (one horizontal period). The line-sequence conversion enables a band of the recording signal to be narrow. The respective center frequencies of the two color difference signals are offset from each other so as to identify a color sequence of the line sequence.

Also, the signal processing is substantially digitally performed thereby allowing the operation to be stabilized and an integrated circuit arrangement to be easily realized. Furthermore, an A/D converter is provided on the input side of the signal processing section and a D/A converter is provided on the output side and they are commonly used for both recording and reproducing. An additional D/A converter is provided to form component color video signals for monitoring.

Figure 1A:
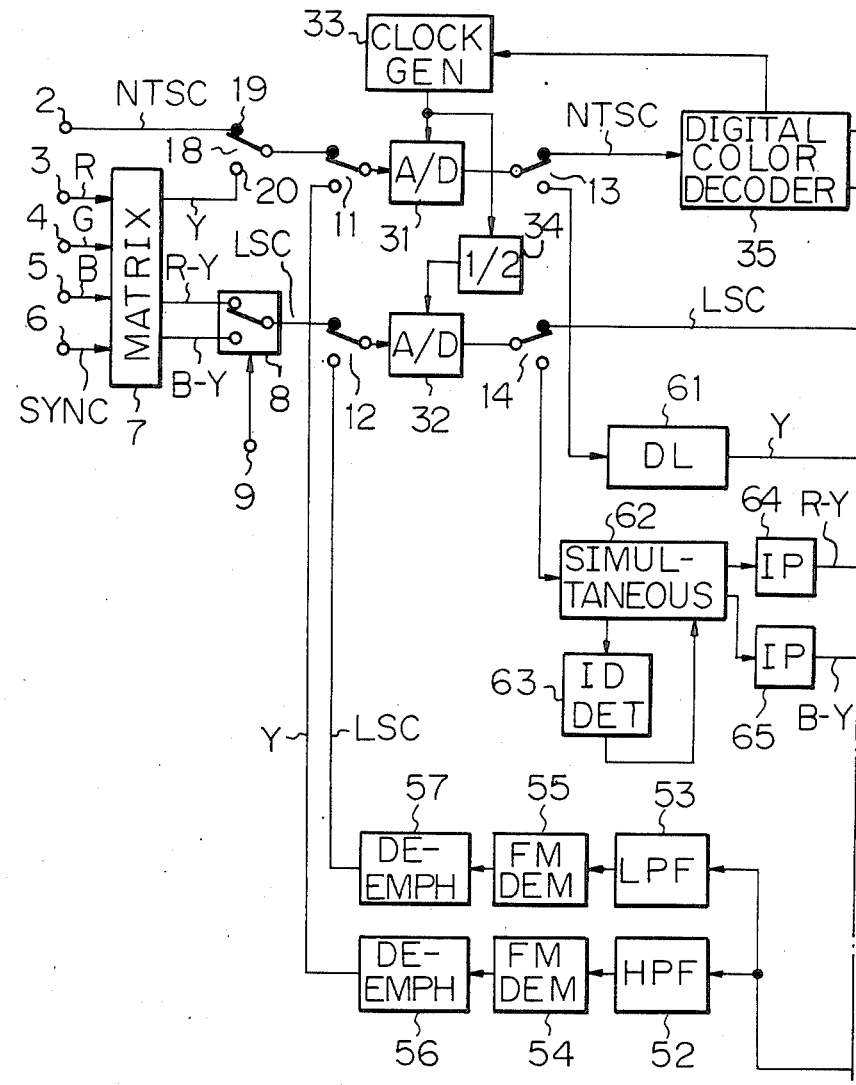
FIGS. 1A and 1B are block diagrams illustrating an example of apparatus for recording and reproducing a color video signal to which the present invention can be applied.
Figure 1B:
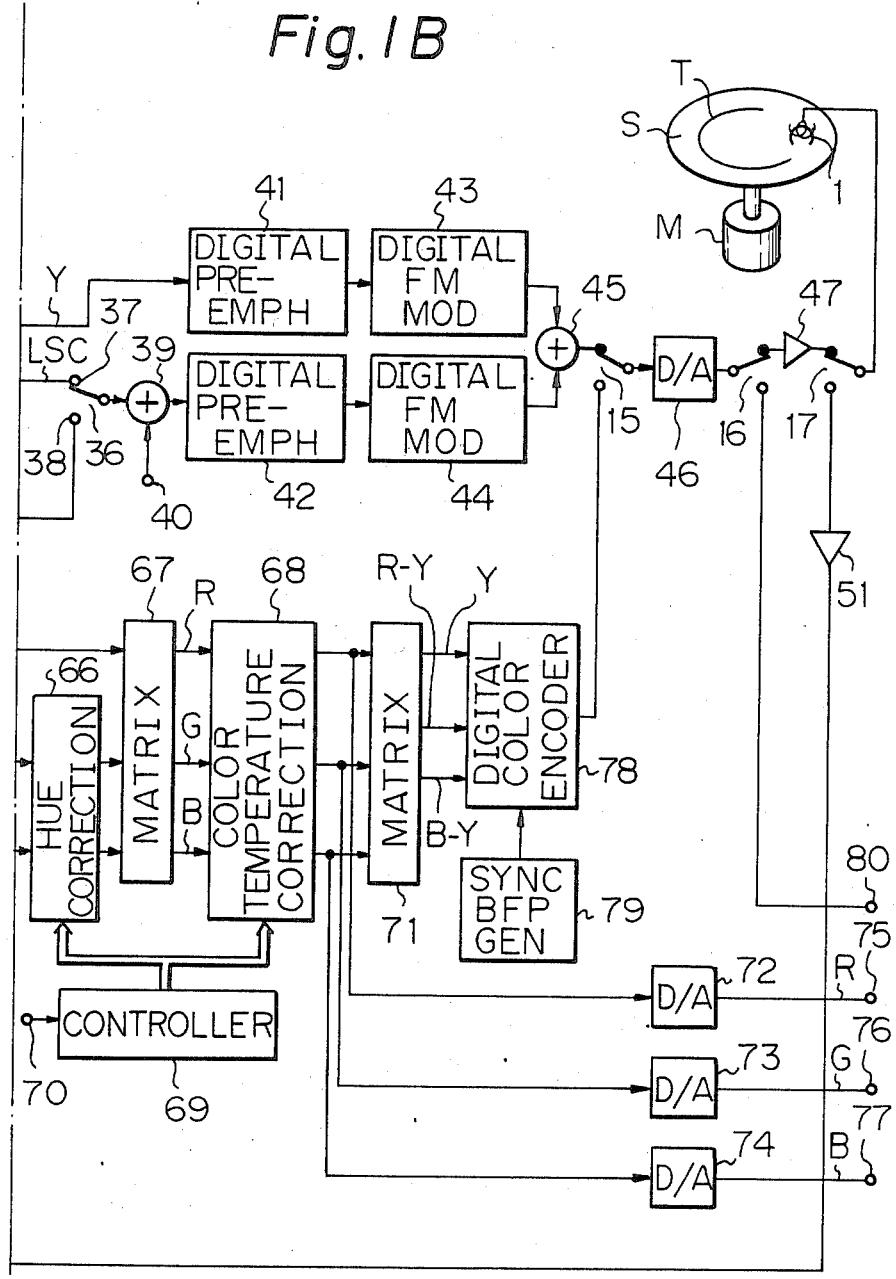

In FIGS. 1A and 1B an NTSC color video signal is supplied to an input terminal 2 and three primary color signals R, G and B are respectively supplied to input terminals 3, 4 and 5 from a color video camera, a microcomputer or other source and a composite sync signal SYNC which corresponds to the component color video signals consisting of the three primary color signals is supplied to an input terminal 6.

The three primary color signals are supplied to a matrix circuit 7 and are converted to the luminance signal Y, to a red color difference signal $R-Y$ and to a blue color difference signal $B-Y$. The two color difference signals from the matrix circuit are supplied to input terminals of a switching circuit 8 and alternately applied to the output terminal of the switching circuit 8 every 1 H period in response to a switching pulse from an input terminal 9. The switching circuit 8 generates a line sequential chrominance LSC. In FIGS. 1A and 1B, the luminance signal is represented by Y, the red color difference signal and the blue color difference signals are indicated by $R-Y$ and $B-Y$, the composite color video signal is represented by NTSC, the line sequential chrominance signal is represented by LSC and the respective components of the primary color signals are indicated by R, G and B whether they are analog or digital signals or whether they are being used for recording or reproduction.

A number of recording/reproduction change-over switches 11 through 17 are mounted in the circuit and each of the switches 11 through 17 have a recording terminal which is indicated by a black dot and a reproducing terminal which is represented by a white circle. In FIGS. 1A and 1B the switches 1 through 17 are in the recording mode position. A switch 19 selects either the NTSC from terminal 19 which is the composite color video signals from input terminal 2 or the luminance signal Y which is supplied to the input terminal 20 of the switch 18. One of the signals selected by the switch 18 is supplied to an A/D converter 31 to the recording terminal of the recording/reproduction change-over switch 11. The line sequential chrominance signal LSC from the switching circuit 8 is supplied to an A/D converter 32 through the recording/reproducing change-over switch 12.

A sampling clock at a frequency of $4f_{sc}$ where $f_{sc}$ is the color subcarrier frequency is supplied from a clock generator 33 to an A/D converter 31. A sampling clock frequency of $2f_{sc}$ is supplied to the A/D converter 32 from the clock generator 33 and through a one-half frequency divider 34. Digital data in which one sample consists of eight bits are obtained as outputs of the A/D converters 31 and 32 respectively. The clock generator 33 generates the sampling clock signal which has a frequency in phase that are synchronized with the input signal. A control data from the digital color decoder 35 is supplied to the clock generator 33. Since the color difference signals have frequency bands that are narrower than the frequency band of the luminance signal they can be A/D converted at a sampling frequency of $2f_{sc}$ without any problem.

The output data of the A/D converter 31 is supplied to the digital color decoder 35 through the recording contact of the switch 13. The digital color decoder 35 performs the processing to separate the composite color video signal into a luminance signal and a carrier chrominance signal as well as the processing for generating a control signal for the clock generator 33 from a burst signal included in the carrier chrominance signal and the processing to digitally demodulate the carrier chrominance signal as well as the processing to convert the two chrominance signals into the demodulated outputs into the line sequential chrominance signal LSC.

The luminance signal Y from the digital color decoder 35 is applied to a digital pre-emphasis circuit 41. The line sequential chrominance signal LSC from the digital color decoder 35 has a sampling rate of $2f_{sc}$ and is supplied to one input terminal 37 of a switch 36. The line sequential chrominance signal LSC from the A/D converter 32 is supplied through the switch 14 to the other input terminal 38 of the switch 36. The line sequential chrominance signal transmitted through the switching circuit 36 is supplied to an adder 39.

ID data supplied from a terminal 40 is fed to adder 39. The ID data has different values depending upon the line of the red color difference signals $R-Y$ and the line of the blue color difference signal $B-Y$. The ID data causes the frequency of the two color difference signals when frequency modulation is not performed to be different. An output of the adder 39 is supplied to a digital pre-emphasis circuit 42. The outputs of the pre-emphasis circuits 41 and 42 are respectively supplied to digital FM modulators 43 and 44 and the modulated outputs of the modulators 43 and 44 are fed to a mixer 45.

An output of the mixer 45 is supplied to a D/A converter 46 through the recording side terminal of switch 15. An analog recording signal is taken from the D/A converter 46 which is supplied to the magnetic head 1 through the recording side terminal of the switch 16, a recording amplifier 47 and the recording side terminal of the switch 17. The recording signal is recorded on the magnetic sheet S by the magentic head 1.

During reproduction all of the switches 11 through 17 are moved to the reproduction position and the signal which is reproduced from the magnetic sheet by the magnetic head 1 is supplied through a reproducing amplifier 51 to a high pass filter 52 and to a low pass filter 53.

The frequency modulated luminance signal is produced at the output of the high pass filter 52 and the FM modulated line sequential chrominance signal is produced at the output of the low pass filter 53. The outputs of the high pass filter 52 and the low pass filter 53 are respectively supplied to analog FM demodulators 54 and 55 and the demodulated outputs of the demodulators 54 and 55 are respectively supplied to de-emphasis circuits 56 and 57.

The luminance signal Y produced at the output of the de-emphasis circuit 56 is supplied to the A/D converter 31 through switch 11 and is converted to a digital signal by A/D converter 31. The line sequential chrominance signal LSC is produced at the output of the de-emphasis circuit 57 and is supplied to the A/D converter 32 through the reproducing side terminal of switch 12 and is converted to a digital signal by a A/D converter 32. The digital luminance signal from the A/D converter 31 is supplied to a delay circuit 61 through the reproducing terminal of the switch 13. The digital line sequential chrominance signal from the A/D converter 32 is supplied to a simultaneous circuit 62 through the reproducing terminal of switch 14.

The simultaneous circuit 62 is constructed such that the line sequential two color difference signals are supplied to a series connection of two 1 H delay circuits and an input and output of the series connection of these 1 H delay circuits are added and the added output is divided by one-half and is outputted from first and third output terminals and second and fourth output terminals extend from the connecting points of the 1 H delay circuits. A mean value of the color difference signal of one of the first and third lines among three continuous lines occur at the output from the first and third output terminals of the simultaneous circuit 62. The other color difference signal of the second line occurs at the output from the second and fourth output terminals. Thus, the simultaneous red color difference signal $R-Y$ can be separated by a switching circuit which selects from one of the first and second output terminals. The simultaneous blue color difference signal $B-Y$ can be separated with a switching circuit so as to select one of the third and fourth output terminals.

An ID detecting circuit 63 receives an input from the simultaneous circuit 62 and supplies an output to the simultaneous circuit 62. The ID detecting circuit 63 detects the ID data added upon recording and specifies the phase of a pulse to control the switching circuits to the correct phase in response to the ID data detected. The two color difference signals which are at the output of the simultaneous circuit 62 are supplied to interpolators 64 and 65. Each of the interpolators 64 and 65 interpolates a mean value of two data before and behind an error data between those datas. The color difference signal $R-Y$ and $B-Y$ for which the sampling rates were converted to $4f_{sc}$ are obtained from the interpolator 64 and 65. This conversion of the sampling rate is necessary to set the sampling rates so they will be identical to the sampling rate of the digital luminance signal.

The digital color difference signals at the outputs of the interpolators 64 and 65 are supplied to the hue correcting circuit or hue controller 66. The hue controller 66 changes the values of the two color difference signals thereby adjusting the phase, in other words, the hue of the chrominance signals from which both of them were synthesized. The color difference signals at the output of the hue color controller 66 and the luminance signal Y from the output of the delay circuit 61 are supplied to a digital matrix circuit 67. The delay circuit 61 has a delay which is equal to the delays of the color difference signals which are caused in the signal lines from the simultaneous circuit 62 to the inputs of the matrix circuit 67.

The three primary color digital signals R, G and B are produced at the output of the matrix circuit 67 and are supplied to a color temperature correcting circuit 68. The data for correction are supplied to the hue controller 66 and the color temperature correcting circuit 68 from a controller 69 which may consist of a microprocessor and a memory. Correcting data is applied to the controller 69 from a terminal 70. The control signals may be formed by an operator operating keys or levers while monitoring the hue and color temperatures of a picture on a monitor.

The three primary color digital signals at the output of the color temperature correcting circuit 68 are supplied to a digital matrix circuit 71 and to D/A converters 72, 73 and 74, respectively. The analog component video signals R, G and B are applied to output terminals 75, 76 and 77 from the D/A converters 72, 73 and 74, and these component color video signals are supplied to the input terminals of a color monitor image receiver where they can be monitored.

The digital luminance signal and two color difference digital signals which have been corrected for hue and color temperature are supplied from the outputs of the digital matrix circuit 71. Outputs of the matrix circuit 71 are supplied to a color encoder 78 and in association with the color encoder 78 a synchronous and burst and flag generating circuit 79 generates a synchronizing signal SYNC and a burst flag pulse BFP and applies it to the digital color encoder 78. The digital NTSC composite color video signal at the output of the color encoder 78 is supplied to the D/A converter 46 through the reproducing terminal of switch 15. The reproduced signal in the form of the analog composite color video signal is produced at the output of the D/A converter 46 and is supplied to an output terminal 80 through the reproduction side terminal of switch 16.

Figure 2:
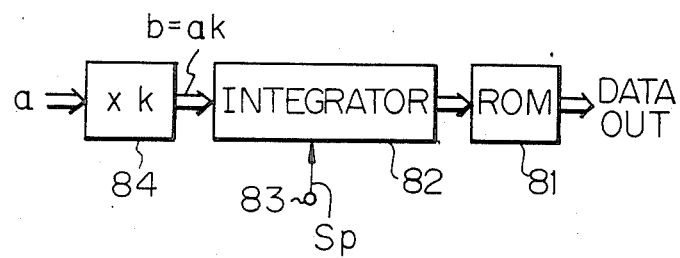
FIG. 2 is a block diagram illustrating an embodiment of the invention.

The invention which is disclosed and claimed in the present invention relates to a signal generator which uses a digital memory which can be applied to the clock generator 33 and/or the digital FM modulators 43 and 44. The first embodiment of the invention is illustrated in FIG. 2 wherein a ROM 81 receives an address input from a integrator 82. A constant a is supplied to the input of a coefficient multiplier 84 which produces a constant output ak. The constant output ak is supplied from coefficient multiplier 84 to the integrator 82. The ROM 81 has $2^n$ addresses in which the data one period of the sine wave data is stored. Generally, the number A of addresses of a ROM and the constant input "a" have predetermined values depending upon the frequency of the sine wave which is generated and the sampling frequency and the number A of the addresses of the ROM is not always $2^n$. Therefore, the coefficient multiplier 84 is provided so as to form the output so that it will be at the same frequency as that of the output which is formed by a ROM having the addresses of the number of A by using a ROM 81 having $2^n$ addresses. Thus, a coefficient k of the coefficient multiplier 84 is set to $(k=2^n/A)$. A digital signal generator which uses a ROM will produce an output signal with a frequency of $(a/A \cdot f_s)$ with respect to the number A of addresses and the constant input a and the sampling frequency $f_s$ as will be described herein. If it be assumed that ($A=2^n$), and for the case of generating a signal of the same frequency the relationship of $$(b/2^n \cdot f_s = a/A \cdot f_s)$$

has to be satisfied where a constant input in such case is b. Therefore, by setting ($k=2^n/A$), the relationship of ($b \cdot f_s = ak \cdot f_s$) is satisfied.

For simplicity of explanation, it is assumed that n is equal to 5 and that the ROM 81 has ($2^n=32$) addresses.

Figure 3:
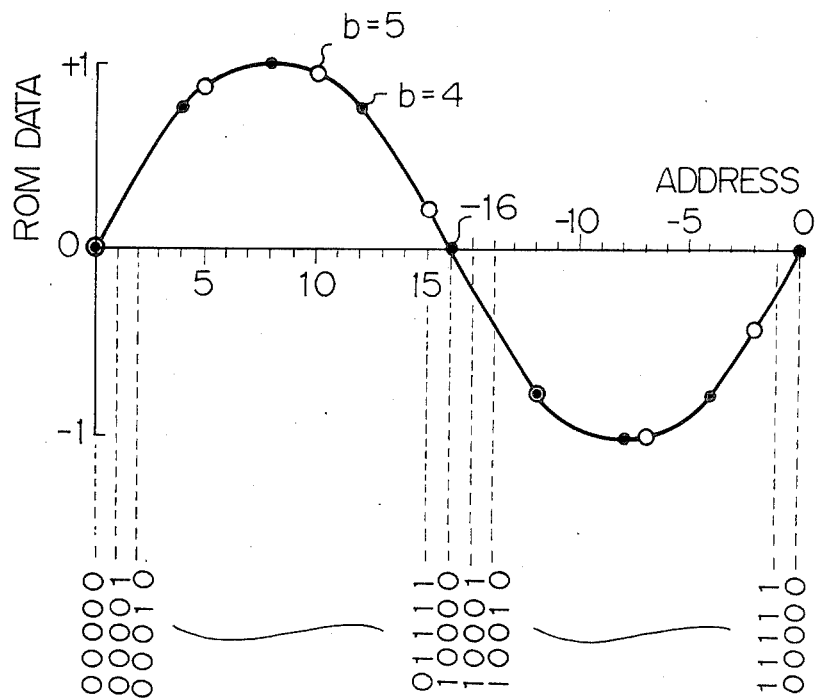
FIG. 3 is a graph for explaining the invention.

As is illustrated in FIG. 3, the digital data corresponding to the amplitudes obtained by dividing one period of a sine wave into thirty two equal parts is stored in the 32 addresses of the ROM 81. This digital data is the code using 2 as a complementary number and consists of five bits. In FIG. 3, the data stored in ROM 81 is expressed by an analog wave form. In addition, the address signal of the ROM 81 consists of five bits using 2 as a complementary number. The data of the positive half period in the data is sequentially stored in the addresses of 0 to 16 and the data of the negative half period is sequentially stored in the addresses of −15 to 0.

A sampling clock pulse $S_p$ is supplied to a terminal 83 of the integrator 82. When it is assumed that the constant input which is produced by the coefficient multiplier 84 is (b=ak) the integrator 82 generates, as an address, an output which increases from 0 to b, 2b, 3b, . . . step by step on a b unit basis whenever the sampling clock signal is supplied. If it is assumed that (b=1), the output from the integrator 82 increases from 0 to 1, 2, . . . step by step and when it becomes (0 1 1 1 1), in other words, +15 and when the next sampling clock signal is supplied, it is inverted to −16, in other words, (1 0 0 0 0). Then, it sequentially decreases to −15, −14, −13, . . . to −1, in other words (1 1 1 1 1) and finally becomes (0 0 0 0 0). Therefore, assuming that the sampling frequency of $f_s$ and b equals one, the sine wave data having a frequency of ($f_s/32$) will be generated by the ROM 81.

Figure 4A:
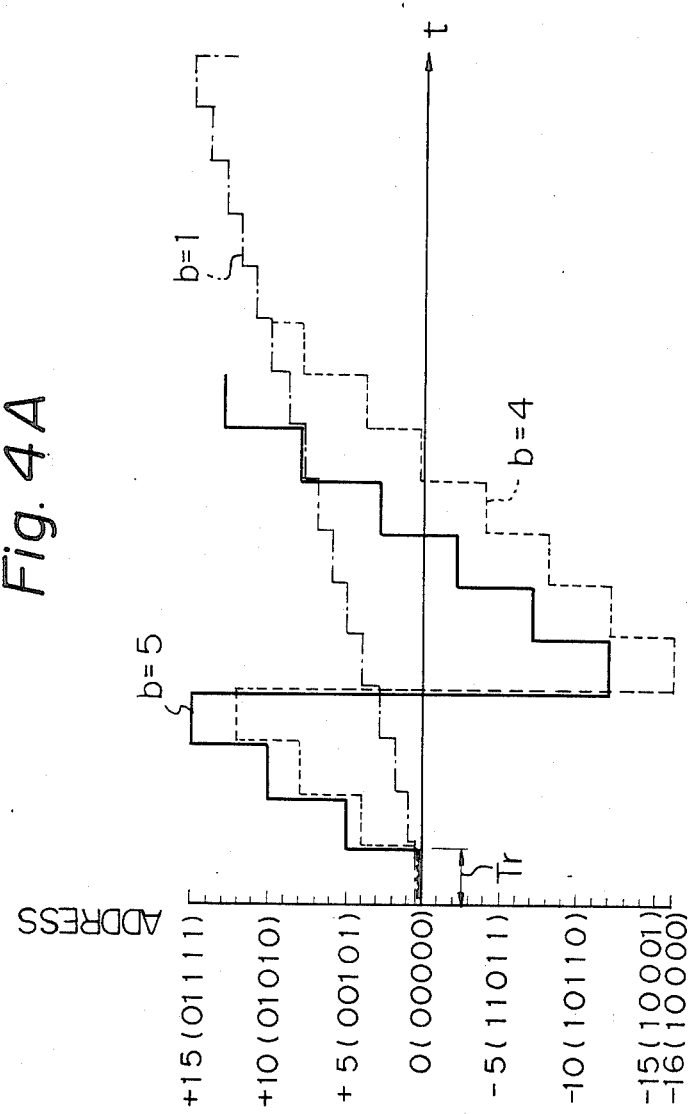
FIGS. 4A and 4B are graphs for explaining the invention.
Figure 4B:
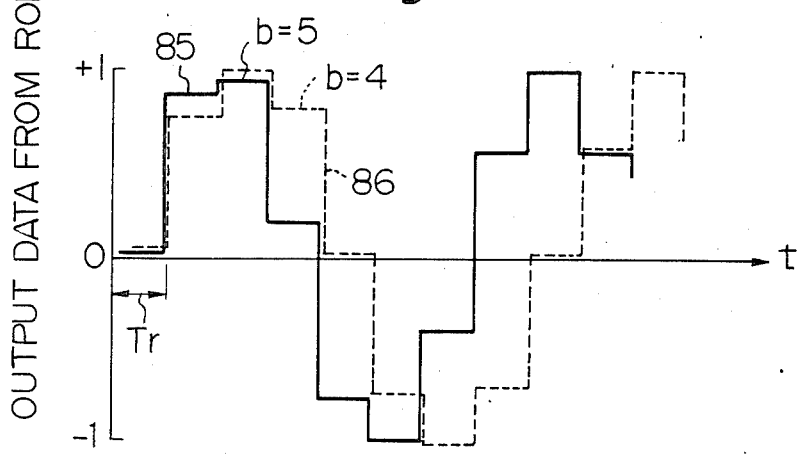

FIG. 4A illustrates in solid line addresses generated from the integrator 82 when (b=5). The address varies step by step at a sampling period of $T_r$ ($=1/f_s$). Thus, the data indicated by white dots in FIG. 3 are sequentially read out from the ROM 81. FIG. 4B illustrates in solid line 85 the sine wave data having a frequency of (5/32 $f_s$) which varies step by step which is read out. The frequency of the sine wave data from ROM 81 can be varied by changing the constant input b(=ak) which is supplied to the integrator 82. On the other hand, when (b=4), the data indicated by black dots in FIG. 3 are sequentially read out and the sine wave data having the frequency of (4/36 $f_s$) is generated as indicated by the broken line 86 in FIG. 4B.

Thus, the present invention makes it possible to constitute a digital variable frequency oscillator. The digitally frequency modulated output can be obtained at the output of the ROM 81 by supplying a luminance signal or a line sequential chrominance signal of a digtal color video signal in place of the constant input a.

Figure 5:
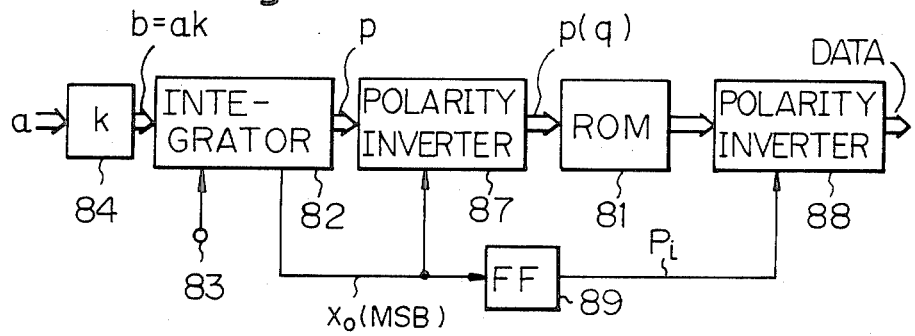
FIG. 5 is a block diagram illustrating a modification of the invention.

FIG. 5 illustrates another embodiment of the invention wherein the capacity of the memory of the ROM 81 in the foregoing embodiment is reduced to ¼. The output data of the integrator 82 is supplied to a polarity inverter 87 which supplies an output to the ROM 81. The data readout from the ROM 81 is provided as the output data after passing through a polarity inverter 88. The number of addresses of the ROM 81 is set to $2^n$ and the address which is the code consisting of (m+1) bits using 2 as a complementary number is supplied from the polarity inverter 87. So as to distinguish from the preceding embodiment, an explanation will be given in a following other embodiment by setting the number of addresses to $2^m$. The polarity inverter 87 is controlled by control signal Pi obtained by frequency dividing the most significant bit $x_0$ by a flip flop circuit 89.

Figure 6:
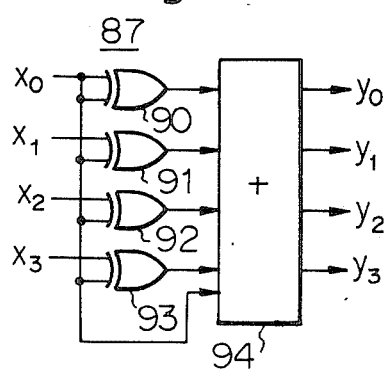
FIG. 6 is a block diagram illustrating a further modification of the invention.

If it be assumed that the number of addresses of the ROM 81 is $2^3$ the polarity inverter 78 may be constructed as shown in FIG. 6. When the output data of the integrator 82 consists of four bits of $x_0$, $x_1$, $x_2$ and $x_3$ each of these bits is supplied to the first input terminals of exclusive OR gates 90, 91, 92 and 93. The most significant bit $x_0$ is supplied in common to the other input terminals of the exlusive OR gates 90 to 93. The outputs of the exclusive OR gates 90–93 are supplied to an adder 94 and the most significant bit $x_0$ is added only to the output of theexclusive OR gate 93. The outputs $y_0$, $y_1$, $y_2$ and $y_3$ occur at the output of the adder 94 will have the polarity opposite to the polarity of the inputs. In other words, they will have been inverted. The polarity inverter 88 can be constructed similar to the polarity inverter 87 which is illustrated in FIG. 6.

Figure 7:
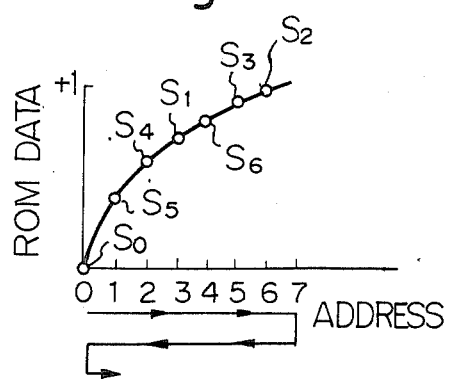
FIG. 7 is a graph for explaining the operation of another embodiment of the invention.

As an example, the sine wave data from 0 to +1 are stored in the ROM 81. When (m=3) as illustrated in FIG. 7, data having eight different values within the amplitude from 0 to +1 is stored in the eight addresses. FIG. 8A is a plot which illustrates changes in address when the constant input b (=ak) is supplied to the integrator 82 is 1.

The output of the integrator 82 increases from 0 to 1, 2, . . . at every sampling period of $T_r$ which is supplied to the integrator 82 and when the output becomes +7, in other words (0 1 1 1), as indicated by a broken line p in FIG. 8A, the output of the integrator 82 will be inverted to −7, in other words, (1 0 0 1) and thereafter the output increases to −6, −5, −4, . . . to −1, in other words, (1 1 1 1) and finally becomes (0 0 0 0). Therefore, the most significant bit $x_0$ of the output data of the integrator 82 changes as illustrated in FIG. 8B. The polarity of the output data of the integrator 82 is inverted by the polarity inverter 87 in the interval where the most significant bit $x_0$ is 1. The polarity of the output data of the integrator 82 is not inverted in the interval where the most significant bit $x_0$ is 0. Therefore, the address at the output of polarity inverter 87 alternately repeats the ascending and descending pattern as indicated by solid line q in FIG. 8A.

As illustrated in FIG. 8B, the most significant bit $x_0$ is supplied to the flip-flop 89 so that the control signal Pi illustrated in FIG. 8C is formed. The polarity of the readout data from the ROM 81 is inverted by the polarity inverter 88 in the interval when the control signal Pi is 1.

As an example, assume that the constant input b (=ak) which is supplied to the integrator 82 is 3, and the data are sequentially read out from the ROM 81 in the order of $S_1$, $S_2$, $S_3$, $S_4$, $S_5$, $S_6$, . . . as is indicated by the white dots. The sine wave data which varies as shown in FIG. 9 is produced at the output of the polarity inverter 88. Arrows illustrate the folded pattern in FIG. 7 represents the readout sequence (S1 to S6) of the data from the ROM 81. When the sampling clock frequency is $f_s$, the frequency of the sine wave can be expressed by (b/32$f_s$). Thus, the frequency modulated output can be obtained by supplying the luminance signal or the line sequential chrominance signal as the input data which is supplied to the coefficient multiplier 84.

FIG. 10 illustrates a different embodiment wherein the data of the positive half period of the sine wave data may be stored in the ROM. In this case, the memory capacity of the ROM 81 is one-half of that of the first embodiment and twice that of the second embodiment. In addition, the data of the negative polarity as well as the positive polarity may be stored in the ROM. Also, the invention can be applied to a circuit for generating a periodic digital data such as a cosine wave, $\sin^2$ wave, a $\cos^2$ wave, or other waves which are different from a sine wave. Also, a RAM may be used as the memory and a predetermined data operated by a microprocessor of similar device may be written into the RAM.

According to the present invention, a digital signal generator having a function similar to an analog VCO (voltage controlled oscillator) can be produced by a memory with a small capacity and can be constructed such that it is not influenced by changes in temperature and time and which is stable and is suitable to be produced as an integrated circuit.

In the present invention, since the number of addresses of the memory is $2^n$ the construction of the integrator for generating the addresses of the memory can be simplified. Also, in this invention, it is possible to easily form a signal by controlling the inversion of the polarity of the output of the integrator or the inversion of the polarity of the readout data from the memory. In other arrangements, which are different from the present invention, unless the number of addresses of the memory is $2^n$ a comparator for detecting when the output data of the integrator reaches a predetermined value will be required which makes the circuit arrangement of the prior art complicated and also slows down the operating speed. According to the present invention, these problems are eliminated because it is possible to perform processing of the data with a high sampling rate using a digital video signal.

Although the present invention has been shown and described with respect to preferred embodiments, it is not to be so limited as changes and modifications can be made which are within the scope of the present invention as defined within the spirit and scope of the attached claims.

We claim as our invention:

1. A signal generator with a digital memory for generating a digital signal having a value which varies periodically comprising: a memory having $2^n$ addresses in each of which a part of data for one period of said digital signal is stored; an address producing circuit supplying an output to said memory and producing an address signal for said memory, a digital control input having a variable value supplied to said address producing circuit and said address signal varying step by step in a predetermined number of intervals corresponding to said digital control input; a detecting circuit receiving an output of said address producing circuit and generating a detection signal when a value of the address produced by said address producing circuit becomes $2^n$ or more; and an inversion control circuit for inverting the polarity of at least one of the address signals to said memory and the output from said memory in response to said detection signal from said detecting circuit.

2. A signal generator according to claim 1, wherein a video signal is supplied to said control input which has a variable value and a frequency modulating signal is obtained at the output of said memory.

3. A signal generator according to claim 1, wherein the data corresponding to a period of one fourth of the period of said digital signal having a periodically variable value is stored in each of said $2^n$ addresses.

4. A signal generator for generating various output signals comprising, a memory having $2^n$ addresses in each of which a part of data for one period is stored, a first polarity inverter supplying an input to said memory, a second polarity inverter receiving the output of said memory, a multiplying circuit receiving a digital control signal and multiplying it by a fixed coefficient, an integrator receiving the output of said multiplying circuit and supplying an input to said first polarity inverter and said integrator receiving a clock pulse, and a flip-flop circuit receiving an output from said integrator and supplying an input to said second polarity inverter.

5. A signal generator using a digital memory for generating a frequency modulated digital signal having a value which varies periodically, the signal generator comprising: a memory having $2^n$ addresses in which data of one period of said digital signal is stored; a circuit for multiplying a digital video signal having a variable value by a predetermined coefficient; and an integrator for integrating the digital video signal multiplied by said coefficient at predetermined clock intervals in order to produce an address signal for said memory, said address signal varying step by step over a predetermined number of clock intervals in dependence on the digital level of said digital video signal and said predetermined coefficient.

6. A signal generator using a digital memory for generating a frequency modulated digital signal having a value which varies periodically, the signal generator comprising: a memory having $2^n$ addresses in which data of one period of said digital signal is stored; a circuit for multiplying a digital video signal having a variable value by a predetermined coefficient; an address producing circuit for producing address signals for said memory, the digital video signal multiplied by said predetermined coefficient being supplied to said address producing circuit, and said address signal varying step by step at clock intervals over a predetermined number of clock intervals in dependence on the digital level of said digital video signal and said predetermined coefficient; a detecting circuit for generating a detection signal when the value of the address signal produced by said address producing circuit becomes $2^{n-1}$ or more; and an inversion control circuit for selectively inverting, in response to said detection signal, the polarity of at least one of the read-out output from said memory and the address signals supplied to said memory.

7. A signal generator according to claim 6 wherein the data corresponding to a quarter of the period of said digital signal is stored in the $2^n$ addresses corresponding to said $2^n$ address signals.

* * * * *